R. M. FREEMAN.
CONVERTIBLE VEHICLE BODY.
APPLICATION FILED NOV. 12, 1917.

1,353,157.

Patented Sept. 21, 1920.
4 SHEETS—SHEET 1.

Witness
L. S. Woodhull

Inventor
Russell M. Freeman

By B. S. Wheeler
Attorney

R. M. FREEMAN.
CONVERTIBLE VEHICLE BODY.
APPLICATION FILED NOV. 12, 1917.
1,353,157.
Patented Sept. 21, 1920.
4 SHEETS—SHEET 2.
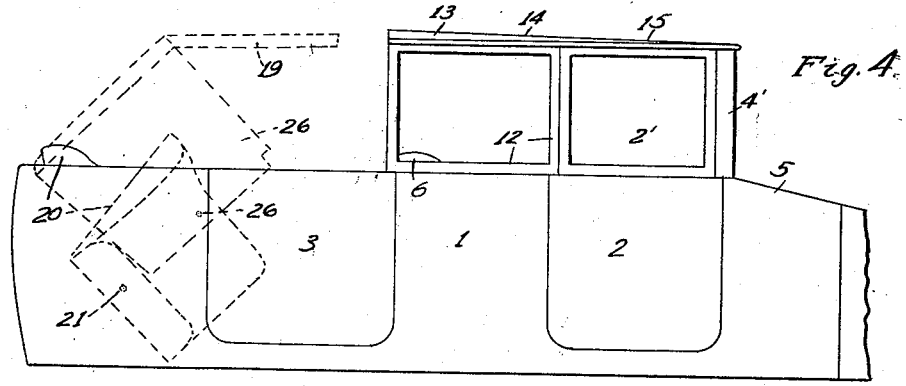
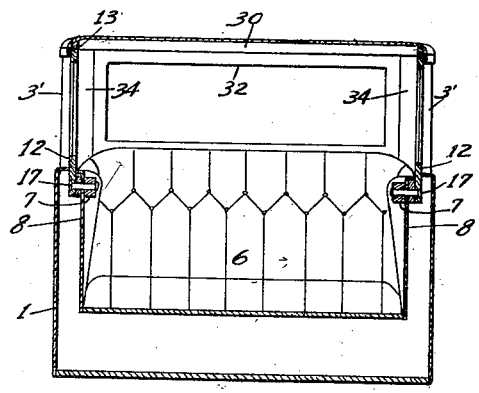
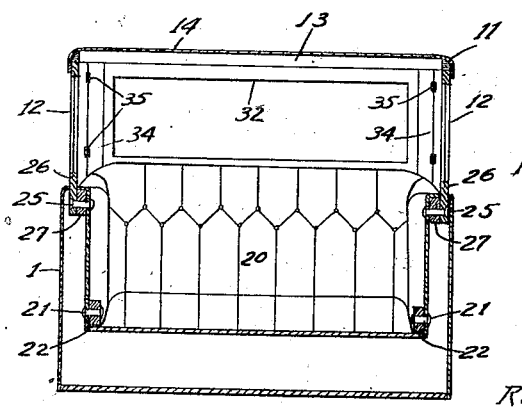
Witness
L. S. Woodhull
Inventor
Russell M. Freeman
By B. F. Wheeler
Attorney R. M. FREEMAN.
CONVERTIBLE VEHICLE BODY.
APPLICATION FILED NOV. 12, 1917.
1,353,157.
Patented Sept. 21, 1920.
4 SHEETS—SHEET 3.
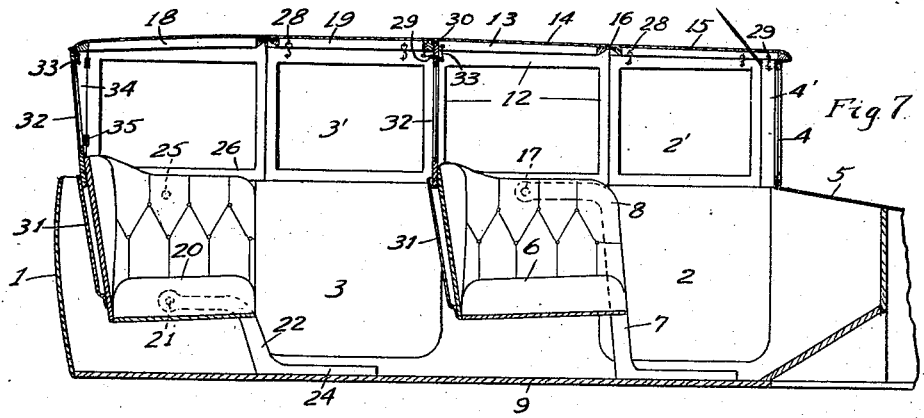
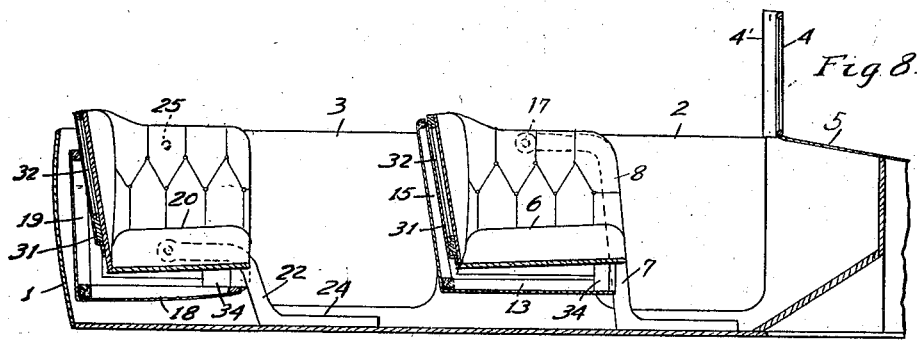
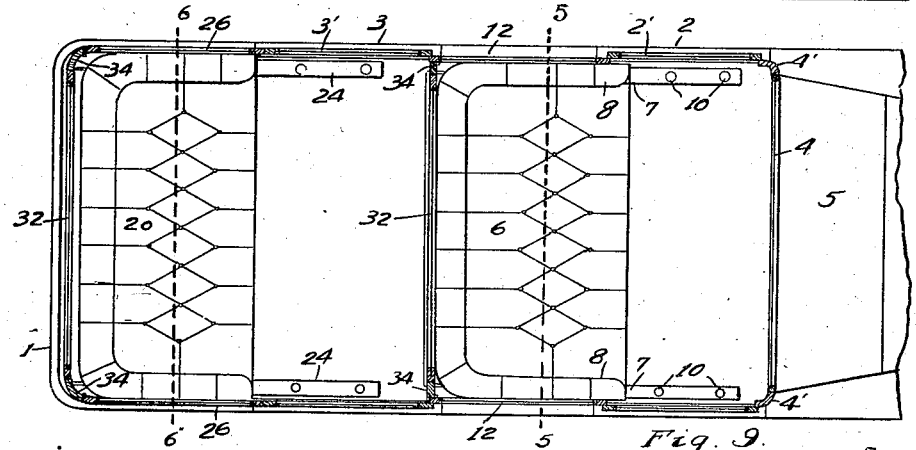
Inventor
Russell M. Freeman
Witness
L. S. Woodhull
By B. F. Wheeler
Attorney

R. M. FREEMAN.
CONVERTIBLE VEHICLE BODY.
APPLICATION FILED NOV. 12, 1917.

1,353,157.

Patented Sept. 21, 1920.
4 SHEETS—SHEET 4.

Witness
L. S. Woodhull

Inventor
Russell M. Freeman.

By B. F. Wheeler
Attorney

UNITED STATES PATENT OFFICE.

RUSSELL M. FREEMAN, OF DETROIT, MICHIGAN.

CONVERTIBLE VEHICLE-BODY.

1,353,157.

Specification of Letters Patent.  Patented Sept. 21, 1920.

Application filed November 12, 1917.  Serial No. 201,706.

*To all whom it may concern:*

Be it known that I, RUSSELL M. FREEMAN, a citizen of the United States, residing at Detroit, in the county of Wayne and State of Michigan, have invented a new and useful Convertible Vehicle-Body, of which the following is a specification.

This invention relates to motor vehicle bodies and especially to that type of body having an inclosing top and employed on touring cars or pleasure vehicles.

The principal object of the invention is to provide a body construction in conjunction with an inclosing top which will be readily convertible from an open to a closed form, and vice versa, and in which the members comprising the top sections may be stored and concealed within the body beneath the seats thereof in a manner to be conveniently accessible for operation.

A further object is to provide means of the above character in which the construction is such as to enable the top sections to be so adjusted relatively as to form the general lines and characteristics of a plurality of types of well known body designs, such as touring, limousine, landaulet and roadsters.

Further objects and advantages will appear from the following description of the construction and operation of the device taken in connection with the accompanying drawings in which a preferred structural embodiment of the essential features of the invention is illustrated, and in which, Figure 1 is a side elevation of the body with top in the upright or inclosing position thereon.

Fig. 4 is a side elevation of the body with forward section of the top in the raised position and indicating by dotted lines an actuated position of the rear seat with top section in the operation of raising and lowering the same.

Fig. 5 is a transverse sectional view through the front top section, seat and body on dotted line 5—5 of Fig. 9.

Fig. 6 is a cross section through the rear top section, seat and body on dotted line 6—6 of Fig. 9.

Fig. 7 is a central longitudinal section through body and top with the latter in raised position.

Fig. 8 is a longitudinal section through the body and top with the latter in the down-folded position, in which the top members are nested and stored beneath the back and under the seats.

Fig. 9 is a horizontal section through the top in the raised position.

Figure 1:
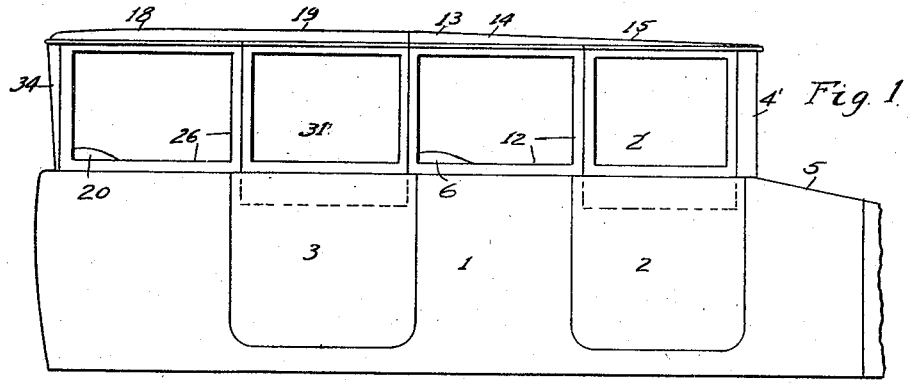
Figure 2:
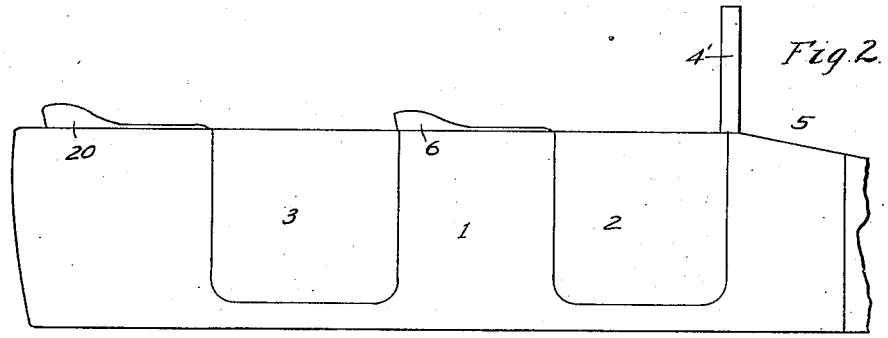
Fig. 2 is a side elevation of the body as it appears with top in the down folded position.
Figure 3:
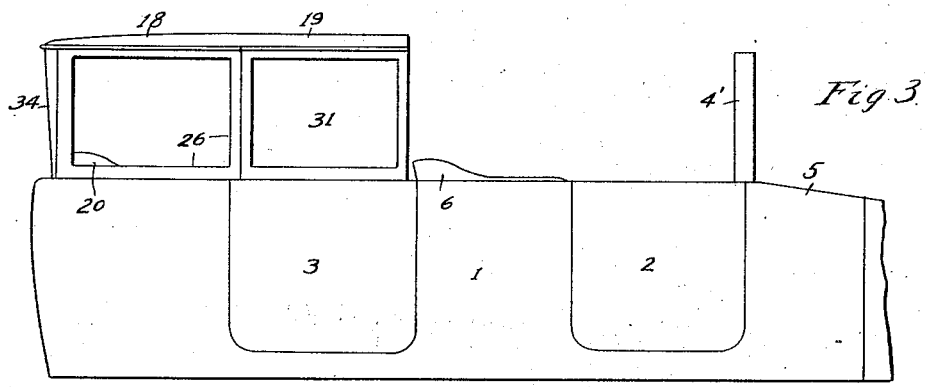
Fig. 3 is a side elevation of the body with rear section only of the top in the upright position.

Referring to the parts of the mechanism, 1 designates a vehicle body of the two-seated or touring type having the usual doors 2 and 3 forward and rear respectively, and also provided with a fixed upright windshield 4 as commonly supported upon the cowl 5 of said body. The forward seat 6 is fixedly supported in spaced relation to the sides and bottom of the body by means of angular uprights 7 which are positioned adjacent the forward edge of the seat in line with the side arms 8 thereof and are fixedly secured at forwardly projecting ends to the frame or floor 9 of the body by bolts as at 10. See Figs. 8 and 9. The upper ends of the upright supports 7 extend rearwardly within the side arms 8 of the seat to points midway the width thereof and form pivotal supports for a forward top section. This top section comprises vertical side panels or frames 12, preferably in the form of windows which are connected at their upper ends transversely of the body by a rectangular frame member 13 having a flexible covering 14 forming the deck of the top section. The upper forward edge of this top section is provided with a foldable deck extension which is hingedly connected thereto by a flexible hinge strip 16 secured to the adjoining edges of the deck members which are oppositely beveled at their under meeting edges to permit the deck member 15 to swing from an extended position in engagement with the supporting posts 4' of the windshield into folded engagement with the forward edges of the top section. The lower ends of the frames 12 of this section are pivotally supported upon studs 17 which extend therethrough and through the ends of the seat supports 7, and upon which said section, together with the deck extension 15, is adapted to swing from the raised to a folded or nested position about the back of the seat and within the space between the bottom and sides thereof and the body of the car, as shown in Fig. 8.

The rear portion of the top, which comprises a rear frame section 18 and a hingedly connected foldable deck extension 19, is substantially the same in construction as the forward portion with the exception that the rear seat 20 is pivotally mounted at each side near its lower extremity upon studs 21 extended therethrough and through the inner ends of angular upright supports 22 which extend through openings 23 in the forward ends of the side arms of said seat and are fixedly secured at the lower angular ends 24 to the frame or floor 9 of the body, (see Figs. 6, 7 and 10) and the rear top section 18 is pivotally mounted to swing upon studs 25 which extend through the lower extremities of the side frames 26 of said section and through cleats 27 secured to the side arms of the seat 20.

Each of the doors 2 and 3 is provided with pockets into which are slidably fitted sashes or windows 2′ and 3′ adapted to be raised vertically within the spaces between the windshield posts 4′ and forward top section 12, and between said section and the rear top section 18 respectively, suitable latch fastenings as indicated at 28 being provided for detachably securing the slidable windows 2′ and 3′ to the respective deck sections 15 and 19, and similar latches 29 are shown for securing said deck sections respectively to the windshield posts 4′ and to a cross member 30 of the forward top section 12.

Figure 10:
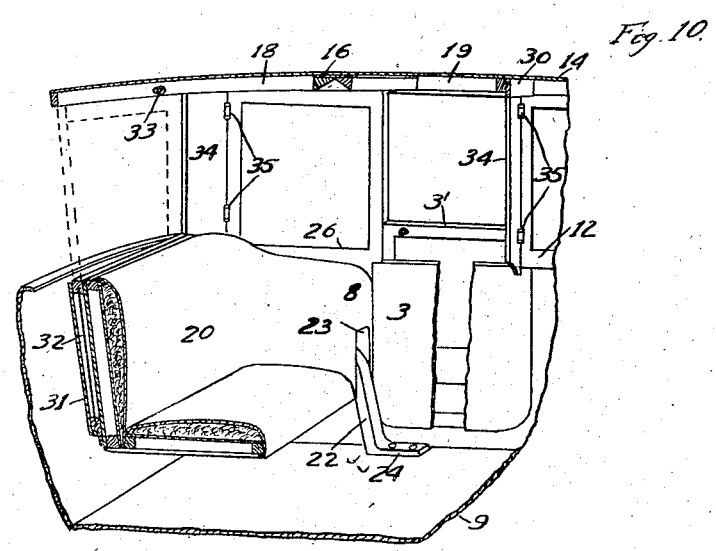
Fig. 10 is a sectional perspective view of the interior of the rear portion of the body with top sections in the raised position.
Figure 11:
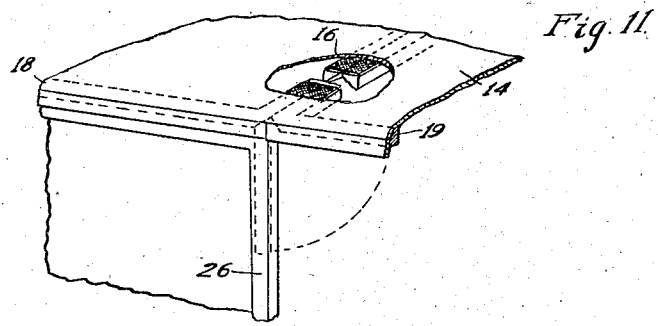
Fig. 11 is a fragmentary perspective view of the foldably hinged members of the top sections.

Formed upon the back of each of the seats is a pocket 31 into which is slidably fitted a window 32 adapted to be extended into engagement with the respective top sections with which it is detachably secured by suitable latches 33, (see Fig. 7) and the spaces between the ends of these windows and the respective top sections at the curved portions of the side arms adjoining the backs of the seats are closed by means of wings 34 hinged at 35 to fold upon the inner faces of the top sections and to swing into alinement with the adjacent edges of said windows, as shown in Figs. 7, 9 and 10.

In the operation of lowering the top sections the door windows and windows at backs of seats are lowered into their respective pockets and the wings 34 are folded inwardly upon their top sections. The deck extension of the rear section is disengaged from the forward section, then by drawing forwardly upon the rear section the seat will be caused to tilt on its pivotal supports, carrying the pivotal bearings of the top section forward sufficiently to enable the deck portions thereof to clear the back of the body (see dotted position in Fig. 4) in passing into the downfolded position beneath the bottom and back of the seat, as shown in Fig. 8. By disengaging the deck of the forward portion of the top from the windshield, the section may be readily lowered by swinging it rearwardly upon its pivotal connection with the front seat into a stored position beneath the bottom and back thereof, as also shown in Fig. 8.

It will be noted that the front seat may be pivotally mounted if desired in a manner similar to that of the back seat, and that where sufficient clearance is provided for the passage of the top at the back of the body the rear seat may be fixedly supported as is the front seat.

What I claim is:

1. In combination with a vehicle body, a seat pivotally supported in spaced relation to the bottom and sides of said body, a top section pivotally mounted on said seat to swing in the space about said seat, and a deck extension hingedly connected to said top section to fold thereon.

2. In combination with a vehicle body, a seat pivotally supported in spaced relation to said body at the sides and bottom thereof, a top section pivotally supported on the seat to swing in the space between said seat and the sides of said body, and a deck extension hingedly connected to said top section to fold thereon and to swing therewith to and from a nested position about said seat.

3. In combination with a vehicle body, a seat pivotally supported on said body in spaced relation to the sides and bottom thereof, a top section pivotally supported on said seat to swing about said seat, and a sash movably carried by said seat and detachably engageable with said top section.

4. In combination with a vehicle body, a seat pivotally supported on said body in spaced relation thereto, a top section pivotally mounted on said seat to swing about the same, and an extendible member carried by said seat and detachably engageable with said top section.

5. In combination with a vehicle body, a seat supported on said body in spaced relation to the sides and bottom thereof, a top section pivotally supported on said seat to swing about said seat, a deck extension hingedly carried by said section to fold thereon and to swing therewith to and from a nested position about said seat, and a closure carried by said seat and movable into detachable engagement with said top section.

6. In combination with a vehicle body having a door therein, a seat supported in said body adjacent said door and in spaced relation to the sides and bottom of said body, a top section pivotally mounted in the space between said seat and body to swing into vertical position adjacent said door, a deck member hingedly connected to extend from said top section above said door, and an extendible member carried by said door and movable into engagement with said top and deck members.

7. In combination with a vehicle body having a door therein, a seat pivotally supported in said body adjacent said door and in spaced relation to said body, a top section pivotally mounted on said seat to swing into vertical position adjacent said door, a deck member hingedly connected to said top section to fold thereon and to extend therefrom above said door, and a movable member carried by said door and detachably engageable with said top and deck members.

8. In combination with a vehicle body having a door therein and a seat adjacent said door, a top section mounted above said seat and having a deck extending above said door, a window slidably mounted in said door and movable into engagement with said deck, and a window slidably mounted in the back of said seat and movable into engagement with said top section.

9. In combination with a vehicle body, a seat pivotally supported on said body in spaced relation to the sides and bottom thereof, and a top section pivotally mounted on said seat to swing about the same, and forming a means for swinging the seat about the pivotal axis of the latter.

In testimony whereof I sign this specification.

RUSSELL M. FREEMAN.